Figure 1B:
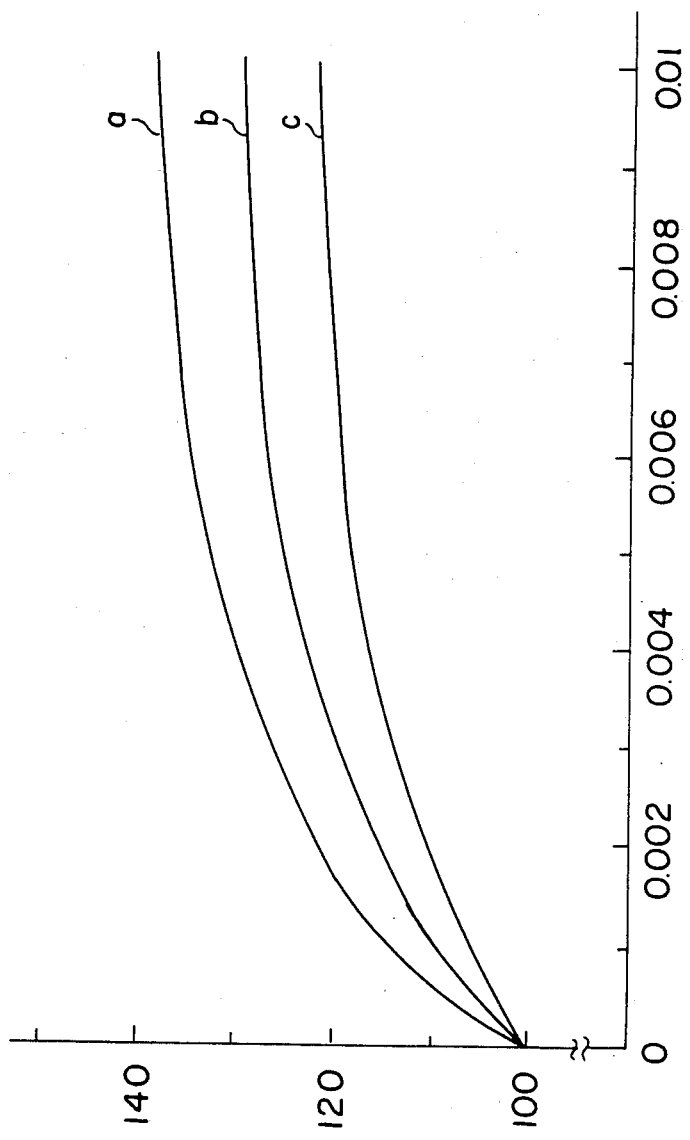

United States Patent [19]

Shimizu et al.

[11] Patent Number: 4,595,639
[45] Date of Patent: Jun. 17, 1986

[54] RADIOGRAPHIC INTENSIFYING SCREEN

[75] Inventors: Etsuo Shimizu, Tokyo; Yuji Aoki; Yujiro Suzuki, both of Odawara; Norio Miura, Isehara, all of Japan

[73] Assignee: Kasei Optonix, Ltd., Tokyo, Japan

[21] Appl. No.: 647,885

[22] Filed: Sep. 6, 1984

[30] Foreign Application Priority Data

Sep. 9, 1983 [JP] Japan ................................. 58-165055
Sep. 16, 1983 [JP] Japan ................................. 58-169357

[51] Int. Cl.$^4$ ...................... B32B 9/00; C09K 11/475
[52] U.S. Cl. .................... 428/690; 250/483.1; 252/301.4 S; 428/323; 428/341
[58] Field of Search ............... 252/301.45; 250/483.1; 428/690, 323, 341

[56] References Cited

U.S. PATENT DOCUMENTS 4,486,486 12/1984 Maeoka et al. ............. 250/483.1 X

Primary Examiner—Jack Cooper
Attorney, Agent, or Firm—Oblon, Fisher, Spivak, McClelland & Maier

[57] ABSTRACT

A radiographic intensifying screen comprising a support and a fluorescent layer formed on the support, characterized in that said fluorescent layer is composed essentially of a rare earth oxysulfide phosphor represented by the formula:

$$(Ln_{1-x-y-z} Tb_x, R_y, A_z)_2O_2S$$

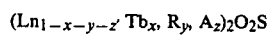

where Ln is at least one element selected from the group consisting of La, Gd, Y and Lu, R is at least one element selected from the group consisting of Nd and Ho, A is at least one element selected from the group consisting of Pr, Er and Yb, and x, y and z are numbers within the ranges of $0.001 \leq x \leq 0.02$, $0.0001 \leq y \leq 0.01$ and $0 \leq z \leq 0.01$, respectively, and $x \geq y+z$.

6 Claims, 8 Drawing Figures

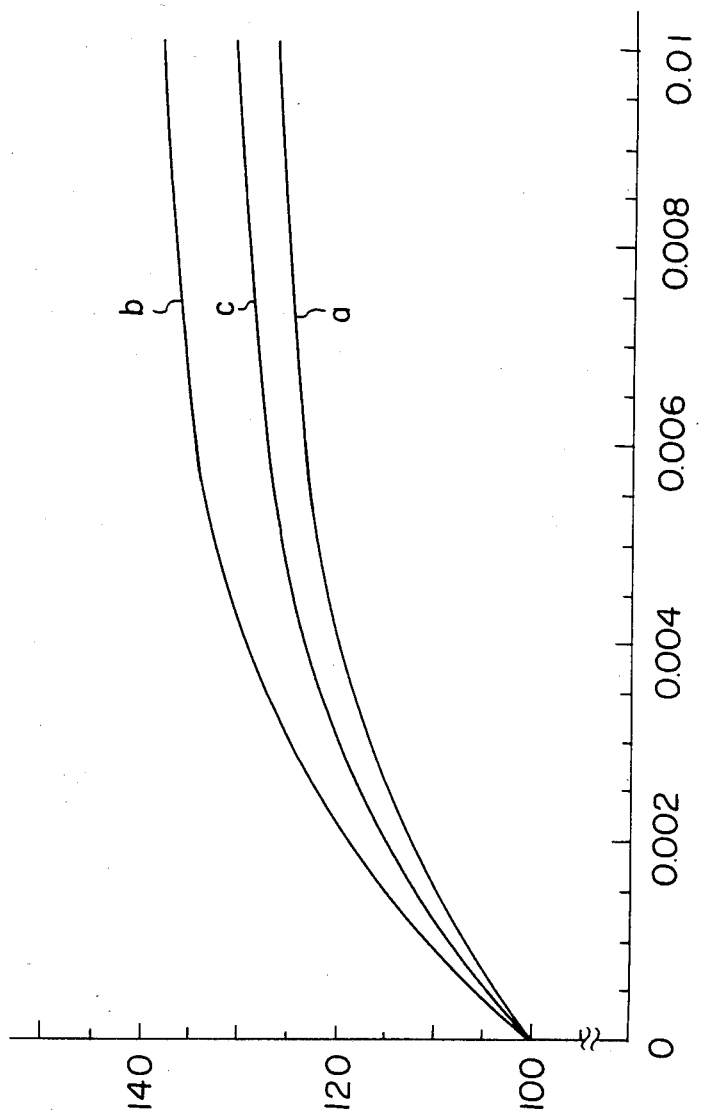

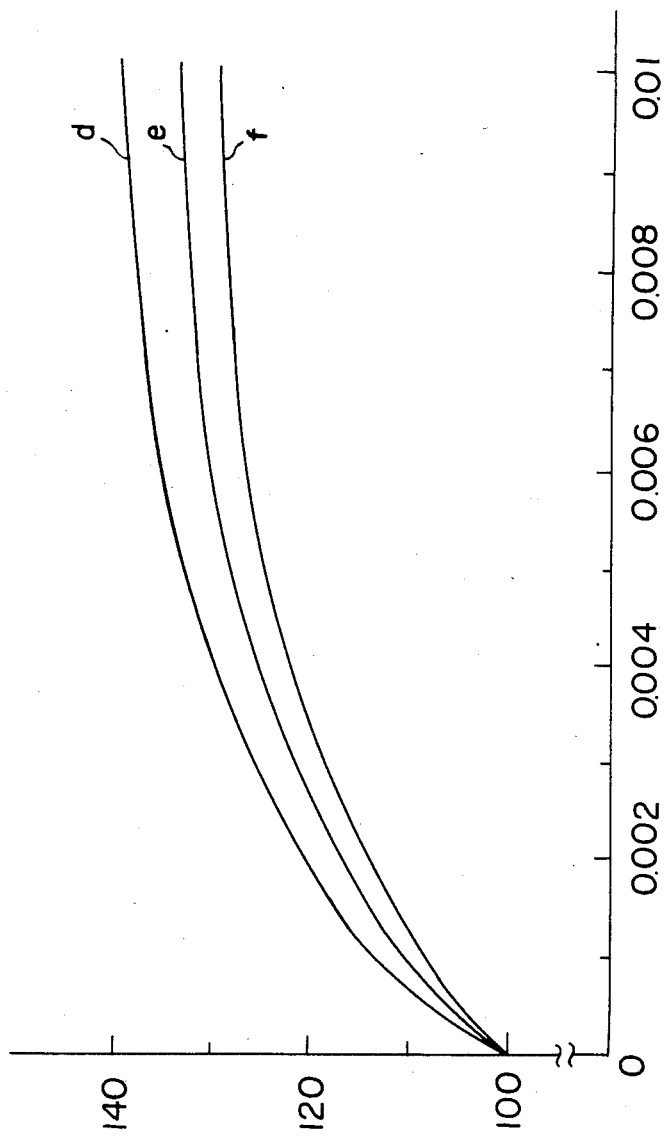

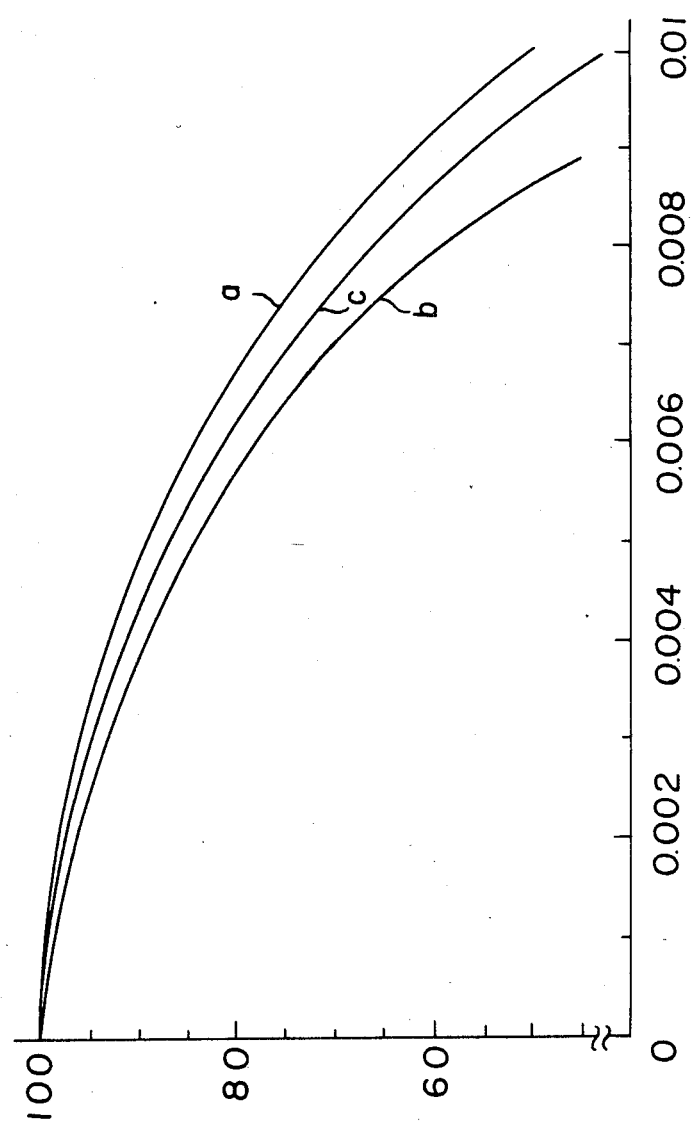

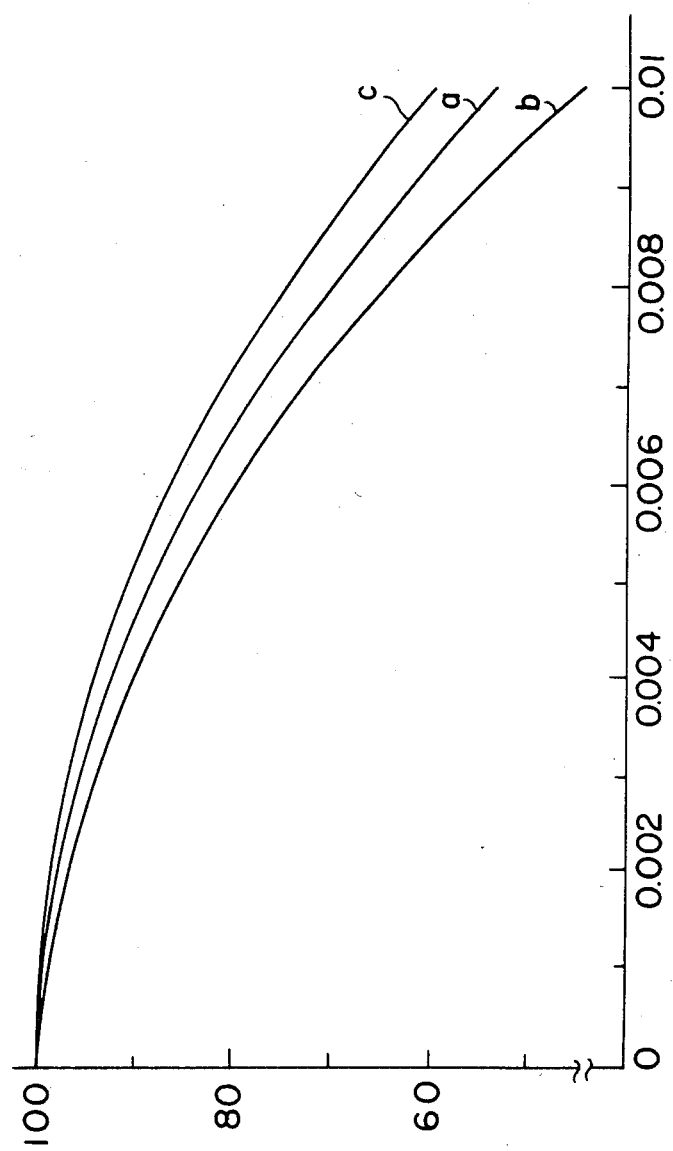

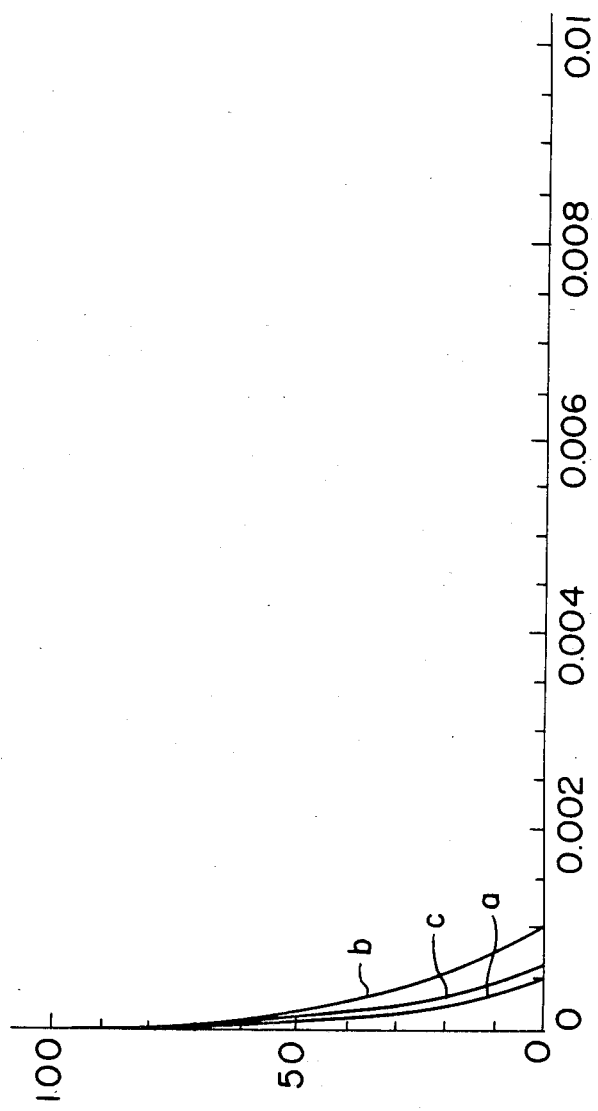

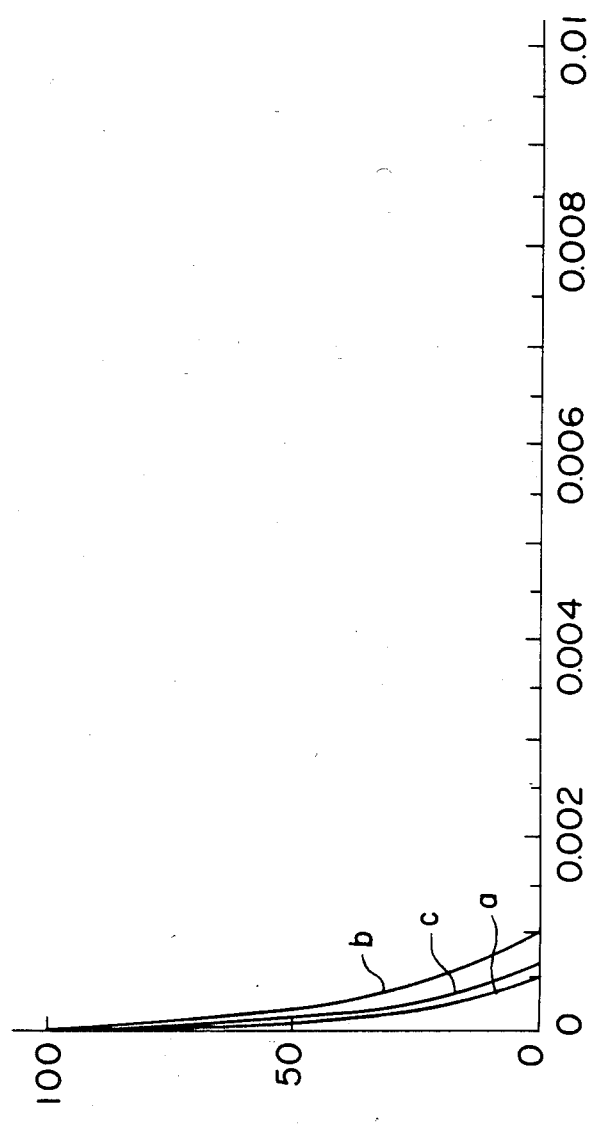

RADIOGRAPHIC INTENSIFYING SCREEN

The present invention relates to a radiographic intensifying screen (hereinafter referred to simply as "intensifying screen"). More particularly, it relates to an intensifying screen having excellent image quality, particularly superior granularity.

As is well known, the intensifying screen is used to fit on an X-ray film to improve the speed in a photographic system in various fields including radiography for medical purposes such as X-ray radiography used for medical diagnosis or radiography for industrial purposes such as non-destructive inspection of materials. Basically, the intensifying screen comprises a support such as a paper or plastic sheet, and a fluorescent layer formed on one side of the support. The fluorescent layer is composed of a binder resin and a phosphor dispersed in the binder and is capable of emitting high luminance light when irradiated by the radiation. The surface of the fluorescent layer is usually protected by a thin transparent protective film such as a nitrocellulose film, a polymethacrylate film or a polyethylene terephthalate film.

As the phosphor for the intensifying screen, $CaWO_4$ has been used for many years. However, in recent years, it has been strongly desired to further improve the speed of the intensifying screen-X-ray film system with a view to reduction of the patients' dosage of radiation, and high speed intensifying screens have been developed wherein a phosphor having a higher X-ray absorption and a higher image conversion efficiency than the conventional $CaWO_4$ phosphor is used to increase the photographic speed of the intensifying screen. Among them, intensifying screens wherein a rare earth oxysulfide phosphor containing terbium as an activator (hereinafter referred to simply as "rare earth oxysulfide phosphor") is used as the fluorescent layer, have been widely used as high speed intensifying screens.

The intensifying screens are desired to have a high sensitivity to radiation (i.e. a high light conversion efficiency or a high photographic speed) and good image quality such as low granularity and high sharpness. The intensifying screens wherein a rare earth oxysulfide phosphor is used as the fluorescent layer, have a substantially improved speed over the intensifying screens wherein the $CaWO_4$ phosphor is employed. However, they have a serious drawback that the granularity tends to increase (i.e. the image quality tends to be poor). Besides, they exhibit after glow to some extent, and when an X-ray photograph is taken by means of this intensifying screen, an after image is likely to be formed due to the after glow and gives rise to an error in the diagnosis. Thus, an improvement has been desired in this respect.

The present invention has been accomplished under these circumstances. It is an object of the present invention to improve the granularity of the conventional intensifying screen wherein a rare earth oxysulfide phosphor is used as a fluorescent layer and to provide an intensifying screen having a reduced after glow.

As a result of extensive researches on the relationship between the impurities added to the rare earth oxysulfide phosphor and the photographic image quality of the intensifying screen thereby obtained, it has been found that the above object can be accomplished by employing a rare earth oxysulfide phosphor co-activated by a first co-activator (R) composed of terbium (Tb) plus neodymium (Nd) and/or holmium (Ho), and, if necessary, further co-activated by a second co-activator (A) composed of at least one element selected from the group consisting of praseodymium (Pr), erbium (Er) and ytterbium (Yb). The present invention has been accomplished based on this discovery.

Namely, the present invention provides a radiographic intensifying screen comprising a support and a fluorescent layer formed on the support, characterized in that said fluorescent layer is composed essentially of a rare earth oxysulfide phosphor represented by the formula:

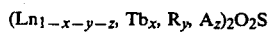
$$(Ln_{1-x-y-z}, Tb_x, R_y, A_z)_2O_2S$$

where Ln is at least one element selected from the group consisting of La, Gd, Y and Lu, R is at least one element selected from the group consisting of Nd and Ho, A is at least one element selected from the group consisting of Pr, Er and Yb, and X, Y and Z are numbers within the ranges of $0.001 \leq x \leq 0.02$, $0.0001 \leq y \leq 0.01$ and $0 \leq z \leq 0.01$, respectively, and $x \geq y + z$.

When compared with the conventional intensifying screen having a fluorescent layer composed of a rare earth oxysulfide phosphor activated with terbium only, the intensifying screen of the present invention presents a remarkable improvement in the granularity, a substantial reduction of the after glow and little reduction of the sharpness, and it has a substantially higher speed than the conventional intensifying screen wherein the $CaWO_4$ phosphor is employed.

Even when a rare earth oxysulfide co-activated by the first co-activator (R) only is used as the phosphor for the fluorescent layer of the intensifying screen, the granularity of the intensifying screen is substantially improved over the intensifying screen wherein a rare earth oxysulfide phosphor activated by terbium only is used. However, the granularity of the intensifying screen can further be improved when a rare earth oxysulfide phosphor co-activated by the second co-activator (A) together with the first co-activator (R) is used.

In the accompanying drawings, FIGS. 1 (A), (B) and (C) are graphs showing the granularity characteristics of the intensifying screens of the present invention.

Figure 2C:
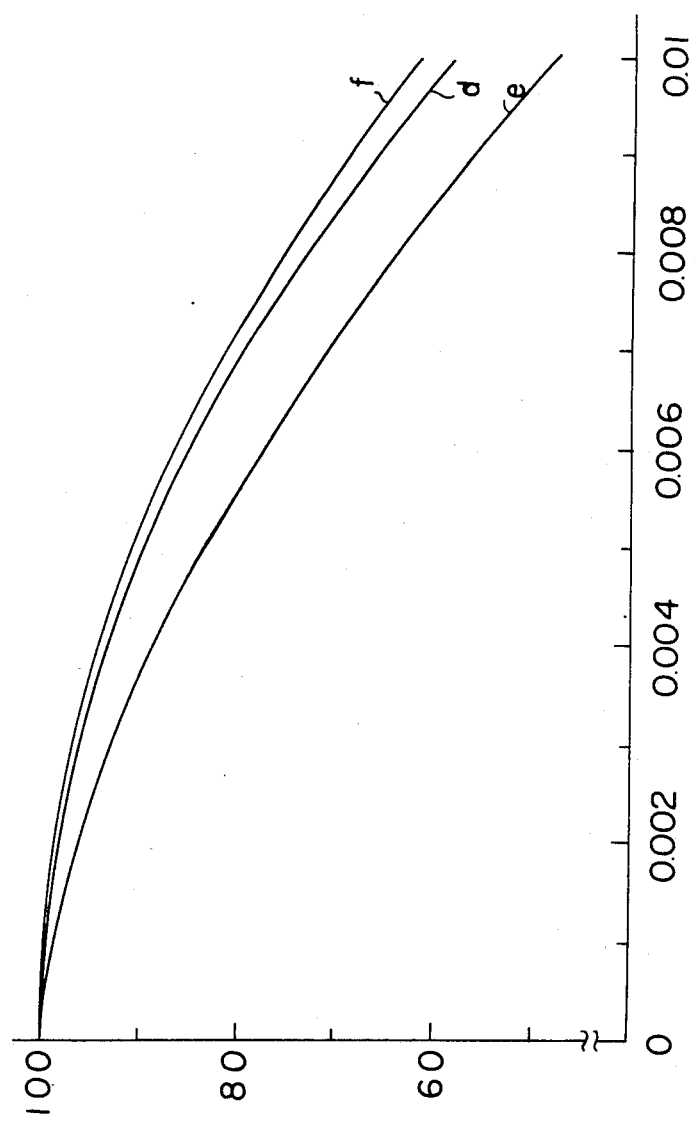

FIGS. 2 (A), (B) and (C) are graphs showing the sharpness characteristics of the intensifying screens of the present invention.

FIGS. 3 (A) and (B) are graphs showing the after glow characteristics of the intensifying screens of the present invention.

Now, the present invention will be described in detail with reference to the preferred embodiments.

The intensifying screen of the present invention is produced substantially in the same manner as the production of the conventional intensifying screens except that the rare earth oxysulfide phosphor represented by the formula $(Ln_{1-x-y-z}, Tb_x, R_y, A_z)_2O_2S$ is used for the fluorescent layer. Namely, proper amounts of the $(Ln_{1-x-y-z}, Tb_x, R_y, A_z)_2O_2S$ phosphor and a binder resin such as nitrocellulose are mixed, and a proper amount of a solvent is further added to obtain a coating dispersion of the phosphor having an optimum viscosity. This coating dispersion is applied onto a support by means of a roll coater or a knife coater and dried to form a fluorescent layer. Some of intensifying screens have a structure in which a reflective layer such as a white pigment layer, a light absorptive layer such as a black pigment layer or a metal foil layer is interposed between the fluorescent layer and the support. In such a case, the reflective layer, light absorptive layer or metal foil layer may be preliminarily formed on the support as the case requires, and then a fluorescent layer composed of the $(Ln_{1-x-y-z}, Tb_x, R_y, A_z)_2O_2S$ phosphor may be formed in the above-mentioned manner. Then, a protective coating dispersion prepared by adding a proper amount of a solvent to a resin such as polyvinyl chloride, polyethylene, cellulose acetate or polyacrylate to have the optimum viscosity, is applied on the previously formed fluorescent layer and dried to form a transparent protective film, as the case requires. Otherwise, it is also possible to prepare the fluorescent layer and the transparent protective film separately and then laminate and bond the fluorescent layer and the protective film onto a support in this order.

In general, the granularity and the sharpness of an intensifying screen are mutually conflicting properties. Namely, when the granularity is improved, the sharpness tends to decrease. However, in the preparation of the intensifying screen of the present invention, in order to improve the granularity and at the same time minimize the reduction of the sharpness, it is preferred to employ a $(Ln_{1-x-y-z}, Tb_x, R_y, A_z)_2O_2S$ phosphor having a mean grain size of from 2 to 15 μm, more preferably from 3 to 10 μm and a standard deviation (quartile deviation Q.D.) of the grain size distribution of at most 0.40. Further, the coating weight of the fluorescent layer is preferably from 10 to 100 mg/cm² in the dried state.

Further, in order to minimize the reduction of the sharpness, it is preferred to provide a light absorptive layer such as a black pigment layer between the support and the fluorescent layer. When a protective film is formed on the fluorescent layer, its thickness is preferably from 3 to 15 μm, more preferably from 3 to 10 μm.

FIG. 1 (A) illustrates the relationship between the content (y) of the first co-activator (R) in a phosphor $[(Ln_{1-x-y}, Tb_x, R_y)_2O_2S]$ containing only the first co-activator (R) (namely, z=0) among rare earth oxysulfide phosphors $[(Ln_{1-x-y-z}, Tb_x, R_y, A_z)_2O_2S]$ used as the fluorescent layer in the intensifying screen of the present invention and the granularity of the intensifying screen wherein this phosphor was employed. Likewise, FIGS. 1 (B) and (C) illustrate the relationship between the total amount (y+z) of the content (y) of the first co-activator (R) and the content (z) of the second co-activator (A) in rare earth oxysulfide phosphors $[(Ln_{1-x-y-z}, Tb_x, R_y, A_z)_2O_2S]$ used as fluorescent layers in the intensifying screens of the present invention, and the granularity of the intensifying screens using the phosphors. They represent the results of the measurements conducted with the photographic speed of the respective intensifying screens fixed at a predetermined level. Curves a, b and c in FIG. 1 (A) represent intensifying screens using $(Gd_{0.99-y}, Tb_{0.01}, Nd_y)_2O_2S$ phosphor, $(Gd_{0.99-y}, Tb_{0.01}, Ho_y)_2O_2S$ phosphor and $(Gd_{0.99-y}, Tb_{0.01}, Nd_{y/2}, Ho_{y/2})_2O_2S$ phosphor, respectively. Likewise, curves a, b, c, d, e, and f in FIGS. 1 (B) and (C) represent intensifying screens using $(Gd_{0.99-y-z}, Tb_{0.01}, Nd_y, Yb_z)_2O_2S$ phosphor, $(Gd_{0.99-y-z}, Tb_{0.01}, Nd_y, Pr_z)_2O_2S$ phosphor, $(Gd_{0.99-y-z}, Tb_{0.01}, Nd_y, Er_z)_2O_2S$ phosphor, $(Gd_{0.99-y-z}, Tb_{0.01}, Ho_y, Yb_z)_2O_2S$ phosphor, $(Gd_{0.99-y-z}, Tb_{0.01}, Ho_y, Pr_z)_2O_2S$ phosphor and $(Gd_{0.99-y-z}, Tb_{0.01}, Ho_y, Er_z)_2O_2S$ phosphor, respectively (where y=z in each case). In FIG. 1 (A), the ordinate represents the granularity index number (G) and the abscissa represents the content (y) of the first co-activator (R) contained in the respective rare earth oxysulfide phosphors. Likewise, in FIGS. 1 (B) and (C), the ordinate represents the granularity index number (G) and the abscissa represents the total amount (y+z) of the contents of the first and second co-activators (R) and (A) contained in the respective rare earth oxysulfide phosphors. Here, the granularity index number (G) is a value represented by the following formula:

$$(G) = \frac{[RMS(0)]}{[RMS(yz)]} \times 100$$

where [RMS(0)] is a RMS value of the conventional intensifying screen wherein a rare earth oxysulfide phosphor $[(Gd_{0.99}, Tb_{0.01})_2O_2S]$ containing no co-activator is used, and [RMS(yz)] is a RMS value of the intensifying screen of the present invention using the rare earth oxysulfide phosphor $[(Gd_{0.99-y-z}, Tb_{0.01}, R_y, A_z)_2O_2S]$ containing the co-activator (R) or co-activators (R) and (A) and having the same photographic speed (i.e. RMS values at a photographic density of 1.0 and a spatial frequency of from 0.5 to 5 lines/mm). The smaller, the RMS value, the better the granularity. Accordingly, the greater the value of the granularity index number (G), the better the granularity over the conventional intensifying screens using rare earth oxysulfide phosphors containing no co-activator. As is evident from FIGS. 1 (A), (B) and (C), by the addition of the co-activator (R) or co-activators (R) and (A) to the rare earth oxysulfide phosphor to be used for the fluorescent layer, the granularity of the intensifying screen thereby obtained is improved. Further, it is evident that until the amount (y) of the first co-activator (R) or the total amount (y+z) of the first and second co-activators (R) and (A) reach to a certain level, the granularity of the intensifying screens continuously improves as the value (y) or (y+z) increases.

FIG. 2 (A) illustrates the relationship between the amount (y) of the co-activator (R) in a phosphor $[(Ln_{1-x-y}, Tb_x, R_y)_2O_2S]$ containing the first co-activator (R) only (namely, z=0) and the sharpness of the intensifying screen using this phosphor. Likewise, FIGS. 2 (B) and (C) illustrate the relationship between the total amount (y+z) of the content (y) of the first co-activator (R) and the content (z) of the second co-activator (A) in a rare earth oxysulfide phosphor $[(Ln_{1-x-y-z}, Tb_x, R_y, A_z)_2O_2S]$ and the sharpness of the intensifying screen using this phosphor. They represent the results of the measurements conducted with the photographic speed of the respective intensifying screens fixed at a predetermined level. Curves a, b and c in FIG. 2 (A) represent intensifying screens using $(Gd_{0.99-y}, Tb_{0.01}, Nd_y)_2O_2S$ phosphor, $(Gd_{0.99-y}, Tb_{0.01}, Ho_y)_2O_2S$ phosphor and $(Gd_{0.99-y}, Tb_{0.01}, Nd_{y/2}, Ho_{y/2})_2O_2S$ phosphor, respectively. Likewise, curves a, b, c, d, and f in FIGS. 2 (B) and (C) represent intensifying screen using $(Gd_{0.99-y-z}, Tb_{0.01}, Nd_y, Yb_z)_2O_2S$ phosphor, $(Gd_{0.99-y-z}, Tb_{0.01}, Nd_y, Pr_z)_2O_2S$ phosphor, $(Gd_{0.99-y-z}, Tb_{0.01}, Nd_y, Er_z)_2O_2S$ phosphor, $(Gd_{0.99-y-z}, Tb_{0.01}, Ho_y, Yb_z)_2O_2S$ phosphor, $(Gd_{0.99-y-z}, Tb_{0.01}, Ho_y, Pr_z)_2O_2S$ phosphor and $(Gd_{0.99-y-z}, Tb_{0.01}, Ho_y, Er_z)_2O_2S$ phosphor, respectively (where y=z in each case). In FIG. 2 (A), the ordinate represents the sharpness index number (M) and the abscissa represents the content (y) of the co-activator (R) contained in the respective rare earth oxysulfide phosphors to be used in the respective intensifying screens. Likewise, in FIGS. 2 (B) and (C), the ordinate represents the sharpness index number (M) and the abscissa represents the total amount (y+z) of the contents of the first and second co-activators (R) and (A) contained in the respective rare earth oxysulfide phosphors to be used in the respective intensifying screens. Here, the sharpness index number (M) is a value represented by the following formula:

$$(M) = \frac{[MTF(yz)]}{[MTF(0)]} \times 100$$

where [MTF(0)] is a MTF value of a conventional intensifying screen using a rare earth oxysulfide phosphor [$(Gd_{0.99}, Tb_{0.01})_2O_2S$] containing no co-activator, and [MTF (yz)] is a MTF value of an intensifying screen of the present invention using a rare earth oxysulfide phosphor [$(Gd_{0.99-y-z}, Tb_{0.01}, R_y, A_z)_2O_2S$] containing the co-activator (R) or co-activators (R) and (A) and with the same photographic speed (i.e. MTF values at a spatial frequency of 2 lines/mm.) The greater the MTF value, the better the sharpness. Accordingly, the smaller the value of the sharpness index number (M), the poorer the sharpness relative to the conventional intensifying screen using a rare earth oxysulfide phosphor containing no co-activator. As is evident from FIGS. 2 (A), (B) and (C), the sharpness of the intensifying screens using rare earth oxysulfide phosphors containing the co-activator (R) or co-activators (R) and (A) gradually lowers as the amount (y) of the first co-activator (R) or the total amount (y+z) of the first and second co-activators (R) and (A) increases. However, in a certain range of the co-activator content, the reduction of the sharpness is extremely small.

FIG. 3 (A) illustrates the relationship between the amount (y) of the co-activator (R) in a phosphor [$(Ln_{1-x-y}, Tb_x, R_y)_2O_2S$] containing the co-activator (R) only (namely z=0) and the after glow characteristic of the intensifying screen using this phosphor. Likewise, FIG. 3 (B) illustrates the relationship between the total amount (y+z) of the first and second co-activators (R) and (A) and the after glow characteristic of the intensifying screen using this phosphor. They represent the results of the measurements conducted with the photographic speed of the respective intensifying screens fixed at a predetermined level. Curves a, b and c in FIGS. 3 (A) represent intensifying screens using $(Gd_{0.99-y}, Tb_{0.01}, Nd_y)_2O_2S$ phosphor, $(Gd_{0.99-y}, Tb_{0.01}, Ho_y)_2O_2S$ phosphor and $(Gd_{0.99-y}, Tb_{0.01}, Nd_{y/2}, Ho_{y/2})_2O_2S$ phosphor, respectively. Likewise, curves a, b and c in FIG. 3 (B) represent intensifying screens using $(Gd_{0.99-y-z}, Tb_{0.01}, Nd_y, Yb_z)_2O_2S$ phosphor, $(Gd_{0.99-y-z}, Tb_{0.01}, Ho_y, Pr_z)_2O_2S$ phosphor and $(Gd_{0.99-y-z}, Tb_{0.01}, Ho_y, Yb_z)_2O_2S$ phosphor, respectively. The quantity of light of the after glow of each intensifying screen was obtained as a relative value by irradiating X-rays to each intensifying screen under the same condition and after 1 second, fixing the intensifying screen on a X-ray film in a dark place, maintaining them for 30 minutes and then measuring the degree of blackness of the X-ray film. In FIG. 3 (A), the ordinate represents the after glow index number (L) and the abscissa represents the content (y) of the co-activator (R) in the rare earth oxysulfide phosphor. Likewise, in FIG. 3 (B), the ordinate represents the after flow index number (L) and the abscissa represents the total amount (y+z) of the first and second co-activators (R) and (A) in the respective rare earth oxysulfide phosphors. Here, the after glow index number (L) is a value represented by the following formula:

$$(L) = \frac{[L(yz)]}{[L(0)]} \times 100$$

where [L(0)] is the quantity of light of the after flow of a conventional intensifying screen using a rare earth oxysulfide phosphor [$(Gd_{0.99}, Tb_{0.01})_2O_2S$] containing no co-activator, and [L(yz)] is the quantity of light of the after flow of an intensifying screen of the present invention using a rare earth oxysulfide phosphor containing the co-activator (R) or co-activators (R) and (A) and with the same photographic speed. Accordingly, the smaller the value of the after glow index number (L), the shorter the after glow becomes over the conventional intensifying screen using a rare earth oxysulfide phosphor containing no co-activator. As is evident from FIGS. 3 (A) and (B), by an addition of a small amount of the co-activator (R) or co-activators (R) and (A), the after glow of the intensifying screen can remarkably be decreased as compared with the conventional intensifying screen using a rare earth oxysulfide phosphor containing no co-activator.

FIGS. 1 to 3 illustrate the cases where the phosphors employed as the fluorescent layers of the intensifying screens of the present invention are rare earth oxysulfide phosphors of the formula $(Ln_{1-x-y-z}, Tb_x, R_y, A_z)_2O_2S$ where Ln=Gd, x=0.01 and y=z when z is other than 0. However, it has been confirmed that when Ln is other than Gd, x is other than 0.01 or y is not equal to z, the rare earth oxysulfide phosphors of the present invention likewise provide intensifying screens having substantially the same granularity, sharpness and after glow characteristics as in the case of the illustrated rare earth oxysulfide phosphors.

In the intensifying screens of the present invention, the Tb content (x) in the rare earth oxysulfide phosphor of the formula $(Ln_{1-x-y-z}, Tb_x, R_y, A_z)_2O_2S$ to be used as the fluorescent layer is preferably within a range of $0.001 \leq x \leq 0.02$ from the viewpoint of the speed as in the case of the conventional rare earth oxysulfide phosphor containing no co-activator. Further, as is evident from FIGS. 1 and 2, if the content (y) of the co-activator (R) or the total amount (y+z) of the first and second co-activators (R) and (A) is increased, the sharpness decreases substantially, although the granularity of the intensifying screen can be improved and inversely, if the amount (y) of the co-activator (R) or the total amount (y+z) of the co-activators (R) and (A) is small, the granularity is not substantially improved, although the reduction of the sharpness can be avoided. From the practical point of view, therefore, y is preferably within a range of $0.0002 \leq y \leq 0.01$ where z=0, or y and z are preferably within the respective ranges of $0.0001 \leq y \leq 0.01$, and $0.0001 \leq z \leq 0.01$ in the case where z is other than 0. Although depending upon the content (x) of the activator (Tb) if the content of the co-activator (R) or co-activators (R) and (A) is made greater than the activator (Tb), the photographic speed of the intensifying screen thereby obtained will be substantially decreased. For this reason, the amount (y) of the co-activator (R) or the total content (y+z) of the co-activators (R) and (A) should preferably be at most the content (x) of the activator (Tb) i.e. $x \geq y+z$.

As described in the foregoing, the intensifying screens of the present invention exhibit remarkably higher speeds than the conventional intensifying screens wherein $CaWO_4$ phosphor is employed. Further, the granularity can substantially be improved with a minimum decrease of the sharpness as compared with the conventional high speed intensifying screens wherein a rare earth oxysulfide phosphor activated by terbium only. Furthermore, the after glow can be reduced as compared with the conventional intensifying screens. Thus, the present invention provides high speed intensifying screens which are capable of improving the diagnostic capability and which are thus quite useful for the industrial application.

Now, the present invention will be described with reference to Examples. However, it should be understood that the present invention is by no means restricted to these specific Examples.

EXAMPLE

Intensifying screens (1) to (25) were prepared in the following manner with use of the respective rare earth oxysulfide phosphors identified in Table 1.

Eight parts by weight of the rare earth oxysulfide phosphor, 1 part by weight of nitrocellulose and an organic solvent were mixed to obtain a coating dispersion of the phosphor. This coating dispersion of the phosphor was uniformly coated by means of a knife coater, on a polyethylene terephthalate support provided on its surface with an absorptive layer of carbon black so that the coating weight of the phosphor became as shown in Table 1, and dried to obtain a fluorescent layer. Then, a protective film-forming coating solution prepared by dissolving cellulose acetate in a solvent, was uniformly applied onto the surface of the fluorescent layer so that the film thickness after drying would be about 5 μm, and then dried to form a transparent protective film.

On the other hand, for the purpose of comprison, an intensifying screen STD was prepared in the same manner as above except that the rare earth oxysulfide phosphor identified by STD in Table 1 was used in the coating amount likewise identified in Table 1.

The speed, granularity index number (G) and sharpness index number (M) of each of the twenty five intensifying screens (1) to (25) of the present invention and the comparative intensifying screen (STD), were measured, each in combination with an ortho-type X-ray film. The results thereby obtained are shown in Table 1. With respect to the intensifying screens (1) to (25) where the speed is substantially the same, the granularity is superior and the reduction of the sharpness is smaller as compared with the conventional intensifying screen (STD).

Further, as is evident from e.g. the comparison between the intensifying screen (2) and the intensifying screen (16) or (17), or the comparison between the intensifying screen (6) and intensifying screen (19), (20) or (21), with respect to the intensifying screens using rare earth oxysulfide phosphors wherein the first co-activator (R) is the same, if the speed of the intensifying screens is substantially the same, the intensifying screens using the rare earth oxysulfide phosphors containing the second co-activator (A) are superior in the granularity to the intensifying screens using the rare earth oxysulfide phosphors containing the first co-activator (R) only.

In Table 1, the characteristics of the respective intensifying screens are the speed, granularity index number (G) and sharpness index number (M) obtained by radiography conducted with X-rays generated at an X-ray tube voltage of 80 KV and passed through a water-phantom having a thickness of 8 cm by means of an ortho-film (RX-OG, manufactured by Fuji Photo Film Co. Ltd.). The values obtained and presented in Table 1 are based on the following definitions.

Speed: A relative value based on the speed of the intensifying screen (STD) having a fluorescent layer composed of $(Gd_{0.99}, Tb_{0.01})_2O_2S$ phosphor where its speed is set at 100. Granularity index number (G) and sharpness index number (M) are as defined above, respectively.

TABLE 1

| Intensifying screen No. | Rare earth oxysulfide phosphors Composition | Mean grain size (μm) | Quartile Deviation Q.D. | Coating weight of the phosphor (mg/cm²) | Speed | Granularity index number (G) | Sharpness index number (M) |
|---|---|---|---|---|---|---|---|
| STD | $(Gd_{0.99}, Tb_{0.01})_2O_2S$ | 5.0 | 0.30 | 30 | 100 | 100 | 100 |
| (1) | $(Gd_{0.989}, Tb_{0.01}, Nd_{0.001})_2O_2S$ | 5.0 | 0.30 | 31 | 100 | 107 | 100 |
| (2) | $(Gd_{0.988}, Tb_{0.01}, Nd_{0.002})_2O_2S$ | 5.2 | 0.29 | 32 | 100 | 112 | 99 |
| (3) | $(Gd_{0.987}, Tb_{0.01}, Nd_{0.003})_2O_2S$ | 5.2 | 0.30 | 33 | 100 | 117 | 97 |
| (4) | $(Gd_{0.988}, Tb_{0.01}, Ho_{0.002})_2O_2S$ | 5.2 | 0.30 | 33 | 100 | 119 | 97 |
| (5) | $(Gd_{0.9895}, Tb_{0.01}, Ho_{0.0005})_2O_2S$ | 5.0 | 0.31 | 31 | 100 | 105 | 99 |
| (6) | $(Gd_{0.993}, Tb_{0.005}, Ho_{0.002})_2O_2S$ | 5.2 | 0.30 | 33 | 100 | 120 | 97 |
| (7) | $(Gd_{0.989}, Tb_{0.01}, Nd_{0.0005}, Ho_{0.0005})_2O_2S$ | 5.0 | 0.31 | 32 | 100 | 108 | 99.5 |
| (8) | $(Gd_{0.988}, Tb_{0.01}, Nd_{0.001}, Ho_{0.001})_2O_2S$ | 5.1 | 0.30 | 33 | 100 | 115 | 99.5 |
| (9) | $(Gd_{0.987}, Tb_{0.01}, Nd_{0.0015}, Ho_{0.0015})_2O_2S$ | 5.3 | 0.32 | 35 | 100 | 120 | 97 |
| (10) | $(La_{0.988}, Tb_{0.01}, Nd_{0.002})_2O_2S$ | 5.2 | 0.30 | 33 | 100 | 111 | 98 |
| (11) | $(La_{0.988}, Tb_{0.01}, Ho_{0.002})_2O_2S$ | 4.8 | 0.35 | 34 | 100 | 118 | 96 |
| (12) | $(Gd_{0.5}, Y_{0.488}, Tb_{0.01}, Ho_{0.002})_2O_2S$ | 5.0 | 0.31 | 33 | 100 | 115 | 97 |
| (13) | $(Gd_{0.5}, Y_{0.487}, Tb_{0.01}, Nd_{0.0015}, Ho_{0.0015})_2O_2S$ | 5.3 | 0.30 | 35 | 100 | 118 | 96 |
| (14) | $(Gd_{0.5}, Lu_{0.492}, Tb_{0.005}, Nd_{0.0015}, Ho_{0.0015})_2O_2S$ | 5.3 | 0.33 | 33 | 100 | 120 | 97 |
| (15) | $(Gd_{0.986}, Tb_{0.01}, Nd_{0.002}, Pr_{0.002})_2O_2S$ | 5.2 | 0.31 | 35 | 100 | 122 | 90 |
| (16) | $(GD_{0.986}, Tb_{0.01}, Nd_{0.002}, Er_{0.002})_2O_2S$ | 5.2 | 0.30 | 34 | 100 | 116 | 95 |
| (17) | $(Gd_{0.986}, Tb_{0.01}, Nd_{0.002}, Yb_{0.002})_2O_2S$ | 5.1 | 0.32 | 35 | 100 | 129 | 92 |
| (18) | $(Gd_{0.985}, Tb_{0.01}, Nd_{0.003}, Yb_{0.002})_2O_2S$ | 5.2 | 0.33 | 36 | 100 | 132 | 88 |
| (19) | $(Gd_{0.986}, Tb_{0.01}, Ho_{0.002}, Pr_{0.002})_2O_2S$ | 5.3 | 0.32 | 34 | 100 | 125 | 89 |
| (20) | $(Gd_{0.986}, Tb_{0.01}, Ho_{0.002}, Er_{0.002})_2O_2S$ | 5.2 | 0.31 | 33 | 100 | 122 | 95 |
| (21) | $(La_{0.987}, Tb_{0.01}, Ho_{0.002}, Yb_{0.001})_2O_2S$ | 5.3 | 0.31 | 33 | 100 | 124 | 95 |
| (22) | $(La_{0.987}, Tb_{0.01}, Nd_{0.002}, Yb_{0.001})_2O_2S$ | 5.3 | 0.32 | 33 | 100 | 120 | 96 |
| (23) | $(Gd_{0.5}, Y_{0.492}, Tb_{0.005}, Nd_{0.002}, Er_{0.001})_2O_2S$ | 5.2 | 0.33 | 32 | 100 | 113 | 98 |
| (24) | $(Gd_{0.5}, Y_{0.487}, Tb_{0.01}, Ho_{0.002}, Pr_{0.001})_2O_2S$ | 5.3 | 0.32 | 34 | 100 | 120 | 92 |

TABLE 1-continued

| Intensifying screen No. | Rare earth oxysulfide phosphors Composition | Mean grain size (μm) | Quartile Deviation Q.D. | Coating weight of the phosphor (mg/cm$^2$) | Speed | Granularity index number (G) | Sharpness index number (M) |
| --- | --- | --- | --- | --- | --- | --- | --- |
| (25) | $(Gd_{0.5}, Lu_{0.991}, Tb_{0.005}, Ho_{0.002}, Yb_{0.002})_2O_2S$ | 5.3 | 0.31 | 35 | 100 | 130 | 85 |

We claim:

1. A radiographic intensifying screen, comprising:
   (a) a support; and
   (b) a fluorescent layer formed on the support, said fluorescent layer consisting essentially of a rare earth oxysulfide phosphor of the formula:

$(Ln_{1-x-y-z}, Tb_x, Ho_y, A_z)_2O_2S$ wherein Ln is at least one element selected from the group consisting of La, Gd, Y and Lu, A is at least one element selected from the group consisting of Pr, Er and Yb, x, y and z are numbers within the ranges of $0.001 \leq x \leq 0.02$, $0.0001 \leq y \leq 0.01$ and $0 \leq z \leq 0.01$, respectively, and $x \geq y+z$.

2. The radiographic intensifying screen according to claim 1, wherein y is a number within the range of $0.0002 \leq y \leq 0.01$ and $z=0$.

3. The radiographic intensifying screen according to claim 1, wherein z is a number within the range of $0.0001 \leq z \leq 0.01$.

4. The radiographic intensifying screen according to claim 1, wherein the phosphor in the fluorescent layer has a mean grain size of from 2 to 15 μm and a standard deviation (quartile deviation) of the grain size of at most 0.40.

5. The radiographic intensifying screen according to claim 1, wherein the coating weight of the phosphor in the fluorescent layer is from 10 to 100 mg/cm$^2$.

6. The radiographic intensifying screen according to claim 1, wherein a light absorption layer is interposed between the support and the fluorescent layer.

* * * * *